US012654781B2

(12) United States Patent
Kim et al.

(10) Patent No.: US 12,654,781 B2
(45) Date of Patent: Jun. 16, 2026

(54) REINFORCEMENT MEMBER FOR REAR FLOOR PANEL

(71) Applicants: Hyundai Motor Company, Seoul (KR); Kia Corporation, Seoul (KR)

(72) Inventors: Hyun-Bin Kim, Incheon (KR); Hyeon-Ho Im, Hwaseong-si (KR); Jee-Han Kim, Suwon-si (KR); Sung-Won Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 643 days.

(21) Appl. No.: 18/163,997

(22) Filed: Feb. 3, 2023

(65) Prior Publication Data

US 2024/0190516 A1 Jun. 13, 2024

(30) Foreign Application Priority Data

Dec. 7, 2022 (KR) ........................ 10-2022-0169711

(51) Int. Cl.
*B62D 25/20* (2006.01)
*B62D 25/08* (2006.01)
*B62D 25/24* (2006.01)

(52) U.S. Cl.
CPC ......... *B62D 25/2027* (2013.01); *B62D 25/08* (2013.01); *B62D 25/24* (2013.01)

(58) Field of Classification Search
CPC .... B62D 25/08; B62D 25/20; B62D 25/2027; B62D 25/24
USPC ...... 296/30, 187.11, 187.08, 193.08, 193.07, 296/203.04, 204
See application file for complete search history.

(56) References Cited

U.S. PATENT DOCUMENTS

| | | | |
|---|---|---|---|
| 5,372,399 A | 12/1994 | Ito et al. | |
| 7,699,385 B2 * | 4/2010 | Kurata | B62D 25/20 |
| | | | 296/187.1 |
| 9,623,911 B2 * | 4/2017 | Kano | B62D 21/11 |
| 2005/0121875 A1 | 6/2005 | Noble | |
| 2010/0170738 A1 | 7/2010 | Ishii | |
| 2013/0257103 A1 * | 10/2013 | Mildner | B62D 25/2018 |
| | | | 296/193.07 |
| 2014/0265450 A1 * | 9/2014 | Shafer | B62D 25/20 |
| | | | 296/193.07 |
| 2016/0001822 A1 * | 1/2016 | Cao | B60R 22/22 |
| | | | 296/193.07 |
| 2016/0176445 A1 * | 6/2016 | Ito | B62D 25/20 |
| | | | 296/193.07 |
| 2017/0113542 A1 * | 4/2017 | Muramatsu | B62D 25/2027 |
| 2017/0197666 A1 * | 7/2017 | Kabayama | B62D 27/02 |
| 2018/0029650 A1 * | 2/2018 | Takahashi | B62D 25/20 |
| 2018/0126835 A1 * | 5/2018 | Saeki | B62D 25/20 |

(Continued)

FOREIGN PATENT DOCUMENTS

| | | |
|---|---|---|
| CN | 103057596 A | 4/2013 |
| CN | 106428235 A | 2/2017 |

(Continued)

*Primary Examiner* — Gregory A Blankenship
(74) *Attorney, Agent, or Firm* — Slater Matsil, LLP

(57) ABSTRACT

An embodiment reinforcement member for a rear floor panel is disposed on an upper surface of the rear floor panel, is coupled to a rear floor center cross member that is configured to support a rear surface of the rear floor panel, and is connected to a maintenance cover hole in the rear floor panel from the rear floor center cross member.

15 Claims, 11 Drawing Sheets

(56) References Cited

U.S. PATENT DOCUMENTS

| | | | | |
|---|---|---|---|---|
| 2019/0061830 | A1* | 2/2019 | Fujisawa | B62D 25/08 |
| 2020/0079437 | A1* | 3/2020 | Kim | B62D 25/20 |
| 2020/0231221 | A1* | 7/2020 | Tsukamoto | B60N 2/005 |
| 2021/0284241 | A1* | 9/2021 | Wirsing | B62D 25/2027 |
| 2022/0314775 | A1* | 10/2022 | Mukumoto | B60K 1/04 |
| 2023/0015322 | A1* | 1/2023 | Hayakawa | B62D 43/10 |
| 2023/0094923 | A1* | 3/2023 | Hayakawa | B62D 25/20 |
| | | | | 296/187.08 |
| 2023/0110288 | A1* | 4/2023 | Hayakawa | B60K 1/04 |
| | | | | 296/204 |
| 2023/0311722 | A1* | 10/2023 | Hayakawa | B60N 2/289 |
| | | | | 297/256.16 |
| 2024/0124071 | A1* | 4/2024 | Miura | B62D 25/20 |
| 2024/0190516 | A1* | 6/2024 | Kim | B62D 25/2027 |
| 2025/0178458 | A1* | 6/2025 | Dong | B62D 25/2027 |

FOREIGN PATENT DOCUMENTS

| | | | |
|---|---|---|---|
| KR | 19970026748 | A | 6/1997 |
| KR | 200122270 | Y1 | 5/1998 |
| KR | 19990002790 | U | 1/1999 |

* cited by examiner

FIG. 2
(Prior Art)

RIGIDITY TRANSFER                                    RIGIDITY TRANSFER

RIGIDITY
TRANSFER PATH

Forced Response Result

REINFORCEMENT MEMBER FOR REAR FLOOR PANEL

CROSS-REFERENCE TO RELATED APPLICATIONS

This application claims the benefit of Korean Patent Application No. 10-2022-0169711, filed on Dec. 7, 2022, which application is hereby incorporated herein by reference.

TECHNICAL FIELD

Embodiments of the present disclosure relate to a reinforcement member for a rear floor panel.

BACKGROUND

Referring to FIGS. 1 to 3, among panels constituting a vehicle body, a rear floor panel 10 includes a front portion 12 disposed below a seat 1 of a rear floor, a rear portion 13 which corresponds to a rear side and where a spare tire is seated, and an inclined portion 14 inclinedly connected between the front portion 12 and the rear portion 13.

A portion that is the biggest problem in noise, vibration, and harshness (NVH) performance of the rear floor panel is a hole below a second-row seat.

The corresponding hole is a cover hole for maintenance or an after-sales service (A/S) hole 11, which is a hole for an A/S of fuel tank maintenance and is a hole which is essentially applied for maintenance without removing a fuel tank 2.

However, as a result of the NVH analysis, it was seen that the largest vibration occurred around the maintenance hole 11 and degraded road noise (rumble, booming, or the like) performance of the overall vehicle body.

However, in the point of view of a trade-off between a package and collision performance (anti-submarine), a structural solution is not easy, and many past types of vehicles are focused on improvement of an overall frequency of a vehicle body by applying a mass damper or a damping material to a position out of a corresponding portion.

What is most needed to overcome the above problem is connectivity between cross-sectional surfaces of a rear floor center cross member 20 coupled to a lower surface of the rear floor panel 10, especially, a lower surface of the inclined portion 14.

However, a direct connection is not possible due to the maintenance cover hole 11, and a reinforcing bar cannot be added due to the fuel tank 2 provided below the rear floor panel 10.

The contents described in the above background section are to aid understanding of the background of embodiments of the present disclosure and may include what is not previously known to those skilled in the art to which the present disclosure pertains.

SUMMARY

Embodiments of the present disclosure relate to a reinforcement member for a rear floor panel. Exemplary embodiments relate to a member for reinforcing noise, vibration, and harshness (NVH) performance of a rear floor panel constituting a vehicle body.

An embodiment of the present disclosure is directed to a reinforcement member for a rear floor panel, which is capable of improving NVH performance of the rear floor panel by reinforcing an upper side of the rear floor panel to achieve a rigidity transfer structure.

Other features and advantages of embodiments of the present disclosure can be understood by the following description and become apparent with reference to the exemplary embodiments of the present disclosure. Also, it is obvious to those skilled in the art to which the present disclosure pertains that the features and advantages of embodiments of the present disclosure can be realized by the means as claimed and combinations thereof.

In accordance with an embodiment of the present disclosure, there is provided a reinforcement member for a rear floor panel which is disposed on an upper surface of the rear floor panel constituting a vehicle body, is coupled to a rear floor center cross member supporting a rear surface of the rear floor panel, and transfers rigidity to a maintenance cover hole formed in the rear floor panel from the rear floor center cross member.

In addition, a rigidity transfer portion, which is formed to be spaced apart from the upper surface of the rear floor panel and to protrude and is formed to extend from a rear end to a front end of the reinforcement member, may be formed in the reinforcement member.

In addition, the rear floor panel may include a front portion, a rear portion formed to have a step difference with respect to the front portion, and an inclined portion inclinedly connected between the front portion and the rear portion, and the reinforcement member may be disposed on an upper surface of the inclined portion.

In addition, the rigidity transfer portion may include a rear portion extending forward from the rear end of the reinforcement member and a front portion extending from the rear portion to the front end of the reinforcement member.

Here, the front portion may be formed to be divided into two branches.

In addition, the rigidity transfer portion may include a pair of legs spaced apart from both side surfaces of the rear portion and connected to both side surfaces of the front portion.

In addition, the reinforcement member may further include a front extension formed to extend from the front end to the maintenance cover hole and a rear extension formed to extend from the rear end to the end of the rear floor center cross member.

Here, the rigidity transfer portion may extend to a front end of the front extension and a rear end of the rear extension.

In addition, a front end portion of the reinforcement member may be formed to extend to a region surrounding the maintenance cover hole.

In addition, a length direction of the reinforcement member may be formed to extend in an inclined direction with respect to a length direction of the rear floor panel.

Meanwhile, the reinforcement member may be formed as a plurality of reinforcement members spaced apart from each other.

In addition, a width of the rear end of the reinforcement member may be greater than a width of the front end thereof.

BRIEF DESCRIPTION OF THE DRAWINGS

Figure 2:
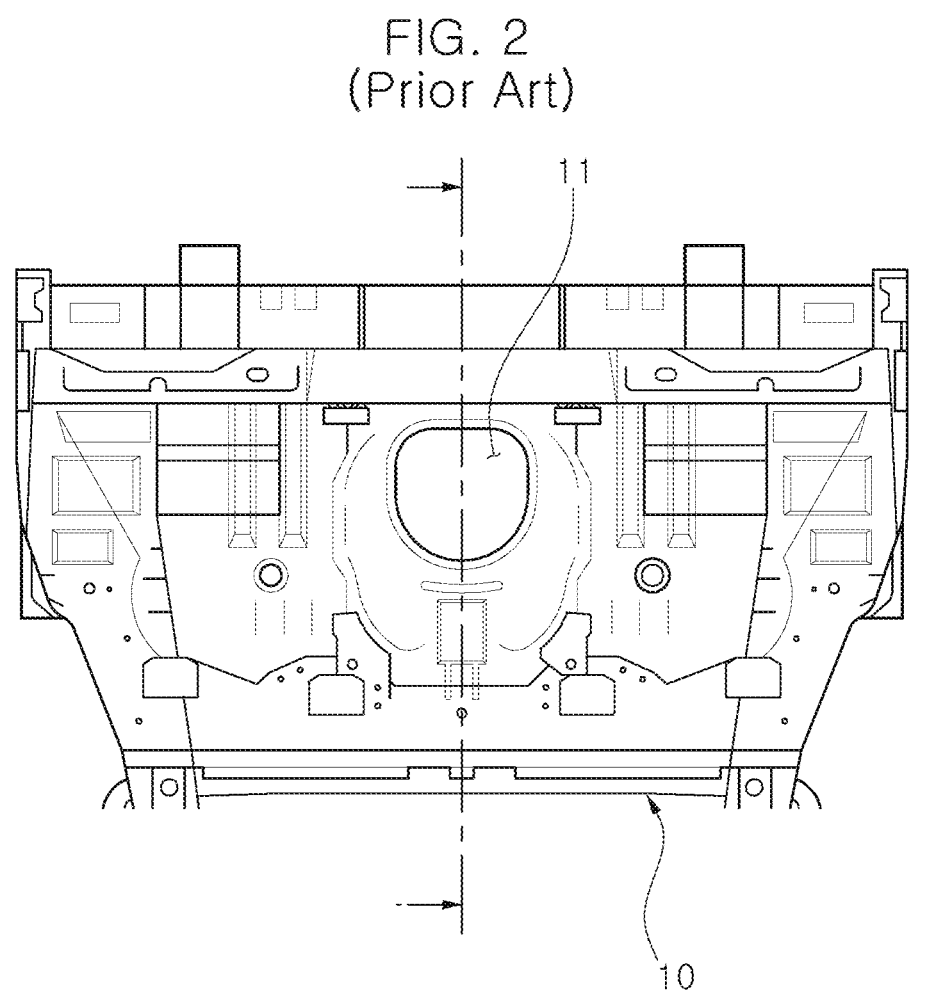

FIG. 2 is a diagram illustrating a portion of the rear floor panel of FIG. 1.

DETAILED DESCRIPTION OF ILLUSTRATIVE EMBODIMENTS

In order to fully understand embodiments of the present disclosure, operational advantages of embodiments of the present disclosure, and features attained by practicing embodiments of the present disclosure, reference should be made to the accompanying drawings that illustrate exemplary embodiments of the present disclosure and to the description of the accompanying drawings.

In describing exemplary embodiments of the present disclosure, known technologies or repeated descriptions may be reduced or omitted to avoid unnecessarily obscuring the gist of embodiments of the present disclosure.

Figure 1:
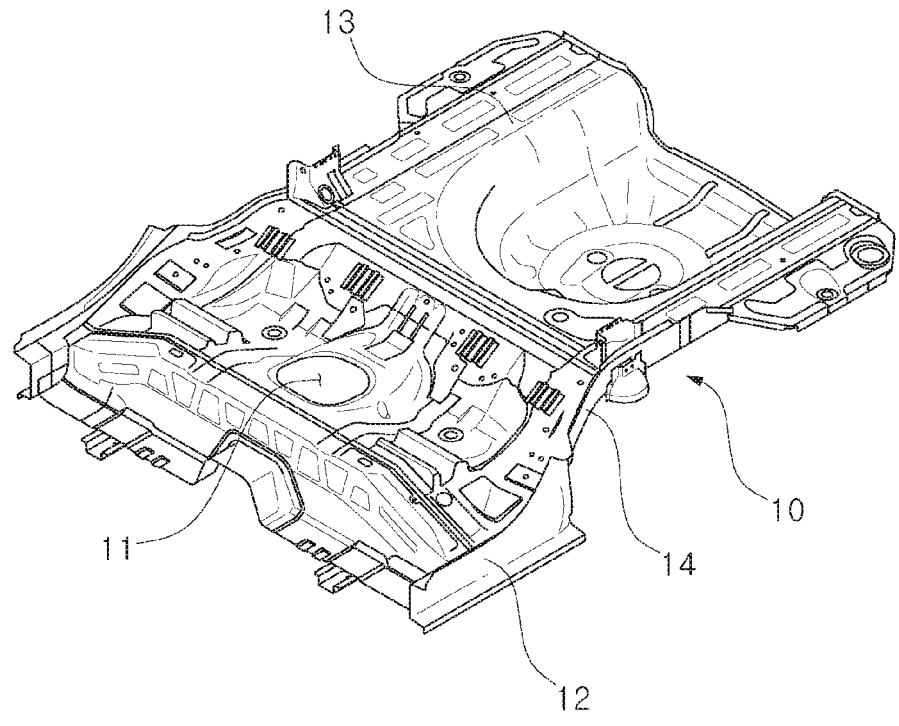
FIG. 1 is a diagram illustrating a general rear floor panel.
Figure 3:
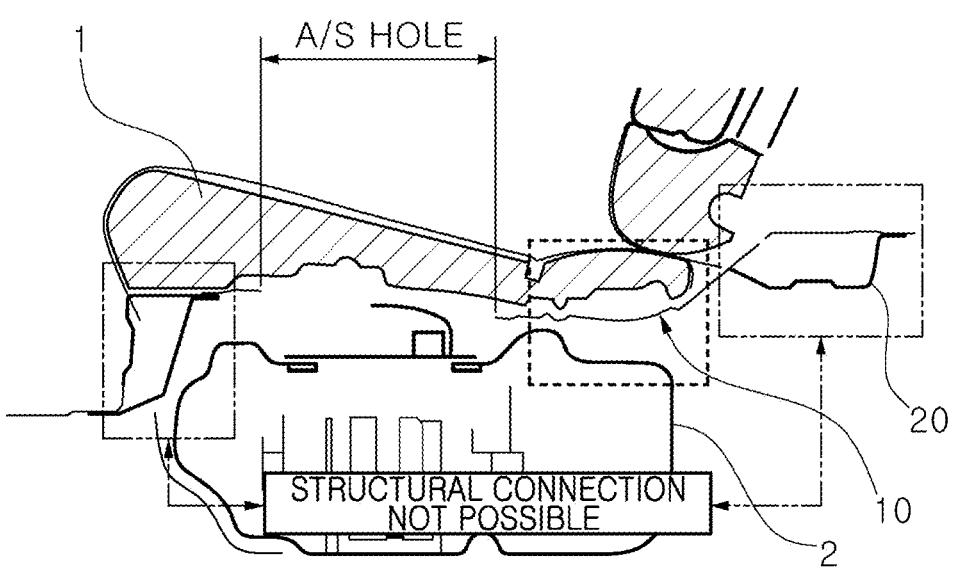
FIG. 3 is a diagram illustrating a cross-section of FIG. 2.
Figure 4:
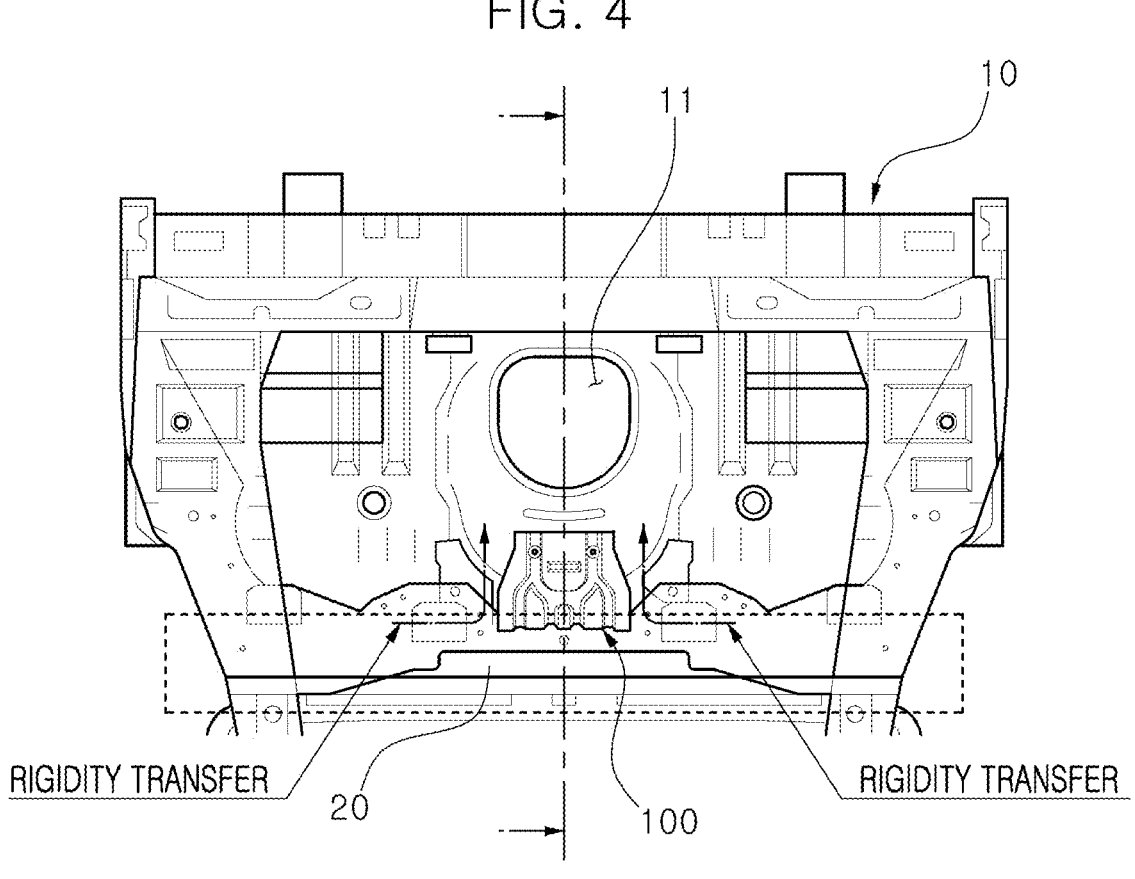
FIG. 4 is a diagram illustrating that a reinforcement member according to embodiments of the present disclosure is applied to a rear floor panel.
Figure 5:
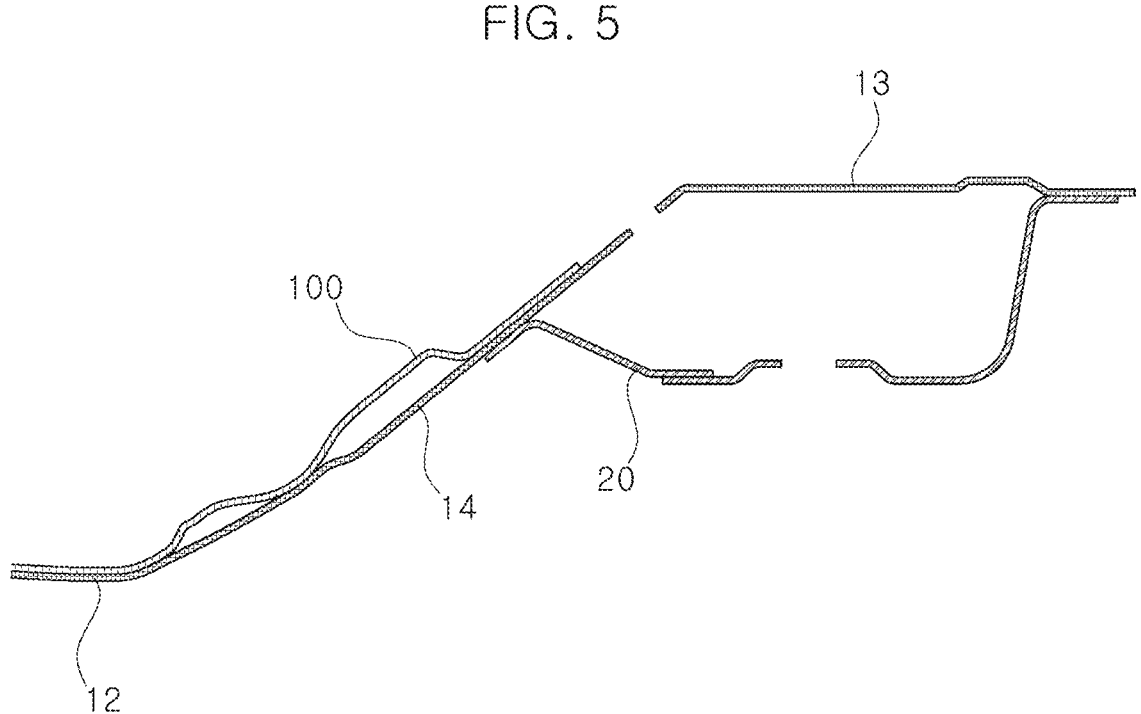
FIG. 5 is a diagram illustrating a cross-section of FIG. 4.
Figure 6:
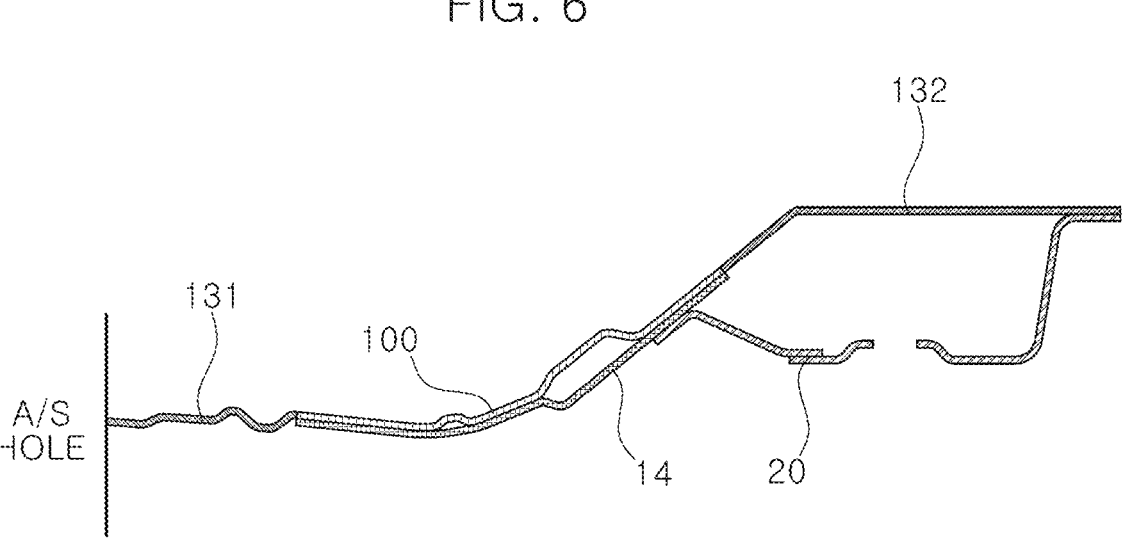
FIG. 6 is a diagram illustrating an applied shape of FIG. 4 and FIG. 5.

FIG. 4 is a diagram illustrating that a reinforcement member according to embodiments of the present disclosure is applied to a rear floor panel, FIG. 5 is a diagram illustrating a cross-section of FIG. 4, and FIG. 6 is a diagram illustrating an applied shape of FIG. 4 and FIG. 5.

Hereinafter, the reinforcement member of the rear floor panel according to an embodiment of the present disclosure will be described with reference to FIGS. 4 and 5.

Embodiments of the present disclosure relate to a member for reinforcing NVH performance of a rear floor panel constituting a vehicle body, and in particular, to a member for suppressing vibration around a maintenance cover hole 11 (an after-sales service (A/S) cover hole) formed in a rear floor panel 10.

As shown in FIGS. 4 and 5, a reinforcement member 100 for a rear floor panel according to embodiments of the present disclosure is disposed on and coupled to an inclined portion 14 of the rear floor panel 10 and transfers rigidity of main frames of the rear floor panel 10 and a rear floor center cross member 20 to the front portion 12 and the maintenance cover hole 11 from a rear portion 13 of the rear floor panel 10 so that vibration of a periphery of the maintenance cover hole 11 may be suppressed.

In addition, the reinforcement member 100 is coupled to a rear floor center cross member 20 coupled to a lower surface of the rear floor panel 10, and in particular, to a lower surface of the inclined portion 14, and the reinforcement member 100 may be coupled by coupling of a bolt passing through a hole formed in the rear floor panel 10 or by welding or bonding.

Furthermore, as shown in FIG. 6, a front extension 131 extending to a front side of the reinforcement member 100 of FIG. 4 and a rear extension 132 extending to a rear side of the reinforcement member 100 are further formed so that it may be more advantageously configured for a rigidity transfer.

In this case, the front extension 131 may extend to the maintenance cover hole 11, and the rear extension 132 may extend to an end of a cross-section of the rear floor center cross member 20 to be coupled thereto.

Figure 7:
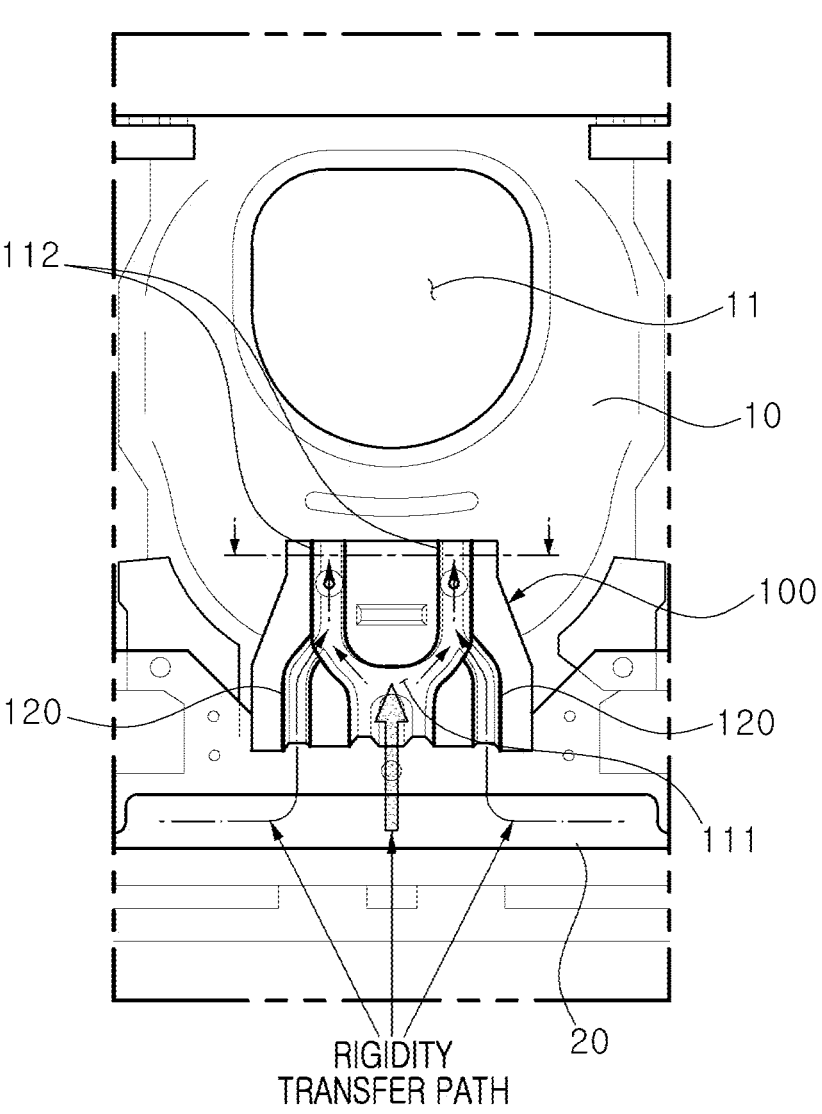
FIG. 7 is a more detailed diagram illustrating the reinforcement member of FIG. 4 according to embodiments of the present disclosure.
Figure 8:
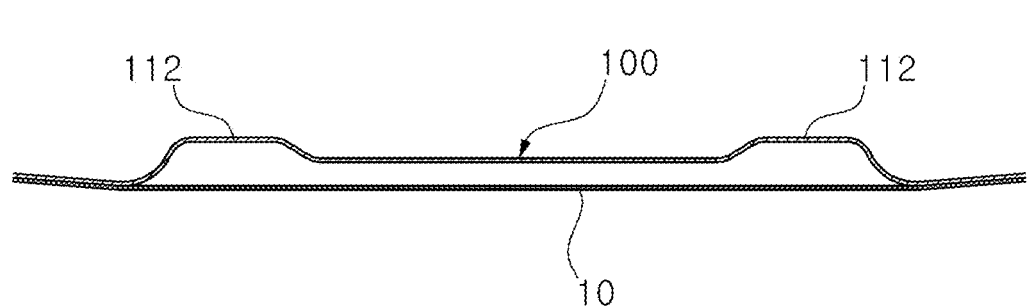
FIG. 8 is a diagram illustrating a cross-section of FIG. 7.

FIG. 7 is a more detailed diagram illustrating the reinforcement member of FIG. 4 according to embodiments of the present disclosure, and FIG. 8 is a diagram illustrating a cross-section of FIG. 7.

To describe the reinforcement member 100 of embodiments of the present disclosure in more detail with reference to FIGS. 7 and 8, in order to form a path for transferring rigidity from the rear side to the front side of the maintenance cover hole 11, the reinforcement member 100 is spaced apart from an upper surface of the rear floor panel 10 to protrude so that a rigidity transfer portion forming a cross-section shown in FIG. 8 is formed to extend from a rear end to a front end.

Rigidity is transferred from the rear side to the front side through the rigidity transfer portion.

The rigidity transfer portion may be divided into a rear portion 111 extending forward from the rear end of the reinforcement member 100 and a front portion 112 extending from the rear portion 111 to the front end of the reinforcement member 100 and, as shown in the drawings, since the front portion 112 is formed in a so-called Y-shape divided into two branches, rigidity may be distributed and transferred.

A configuration and a shape of a cross-section may be implemented in the form of a V shape, an A shape, and an H shape according to a shape of the rear floor panel, in addition to the Y shape.

In addition, a pair of legs 120 spaced apart from both side surfaces of the rear portion 111 and connected to side surfaces of the two front portions 112 are further formed to induce a stronger distribution of rigidity.

In addition, a cross-sectional structure of the member not only serves as a rigidity transfer path but also becomes an effective structure for preventing corrosion by allowing an electrodeposition solution to flow through the cross-section during an electrodeposition process.

In the reinforcement member according to embodiments of the present disclosure, a weight, for example, 190 g, is added so that performance can be improved with a small weight.

Figure 16:
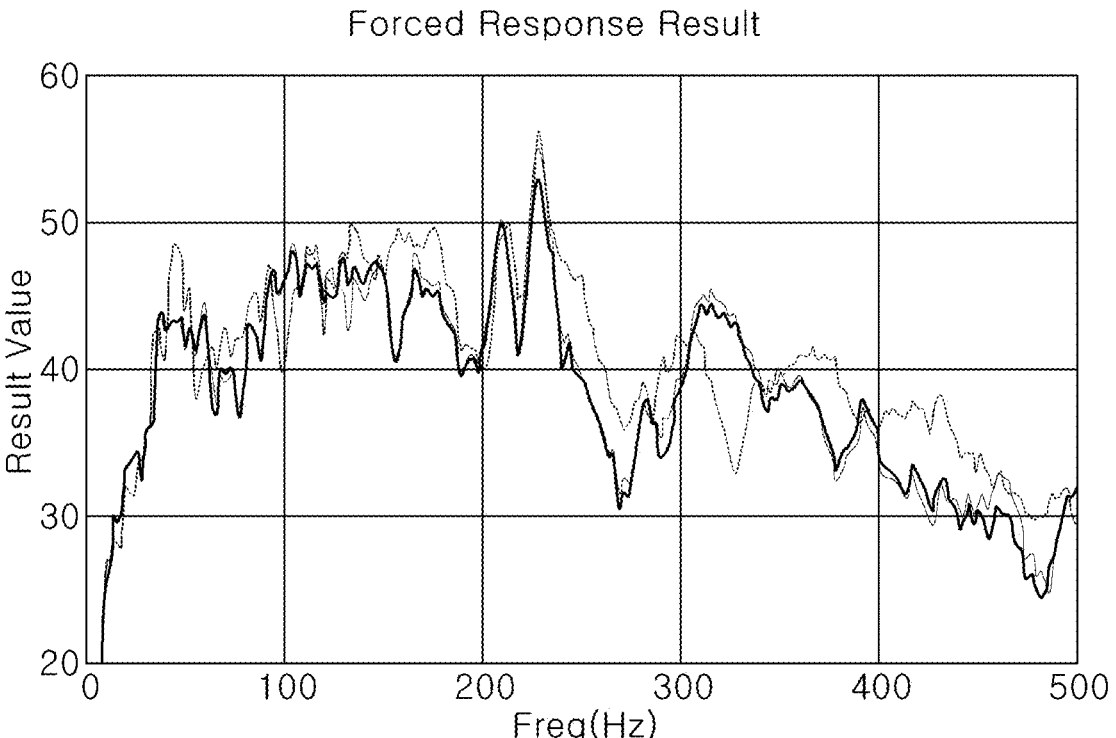
FIG. 16 illustrates a forced response result according to embodiments of the present invention.

In addition, referring to FIG. 16 and Table 1 below, there is an improvement effect of a resonance sound of 1.2 dB, a rumble of 0.6 dB, and an overall sound intensity (OA) of 0.6 dB.

TABLE 1

| Items | Non-application of member (dB) | Application of member according to embodiments of the present disclosure (dB) |
|---|---|---|
| OA | 64.4 | 63.8 |
| Booming | 59.5 | 59.3 |
| Resonant sound | 60.2 | 59.0 |
| Rumble sound | 60.1 | 59.5 |

Figure 9:
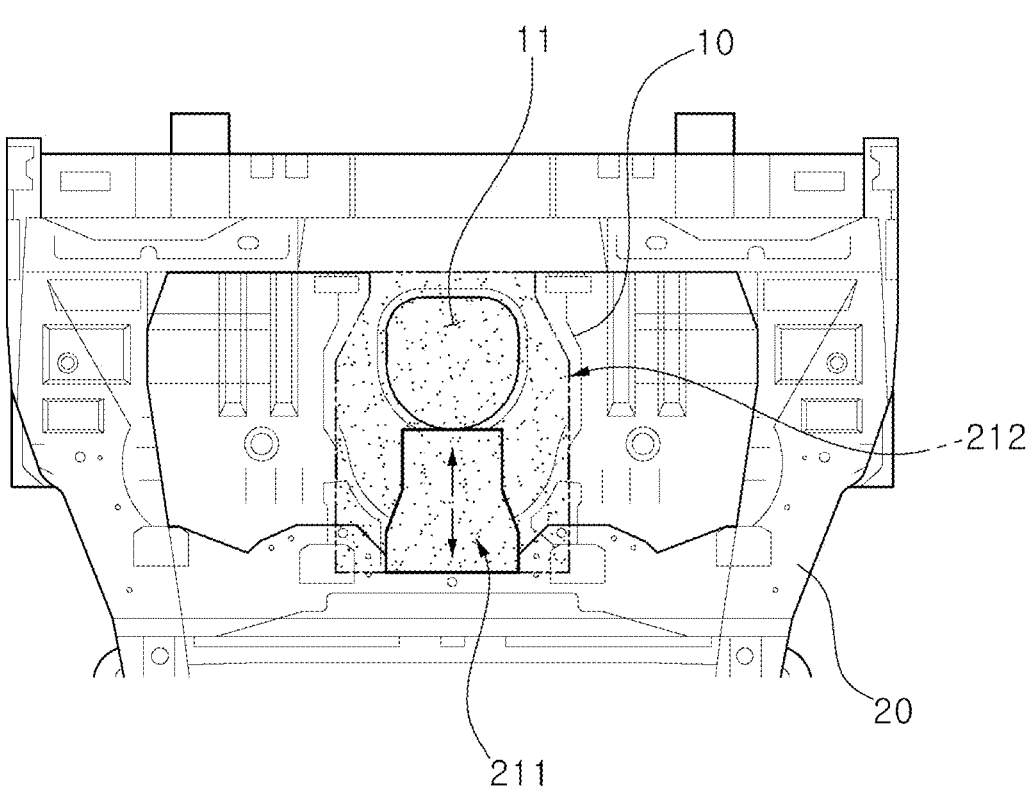
FIGS. 9 to 11 are schematic diagrams illustrating the reinforcement member according to another embodiment of the present disclosure.
Figure 10:
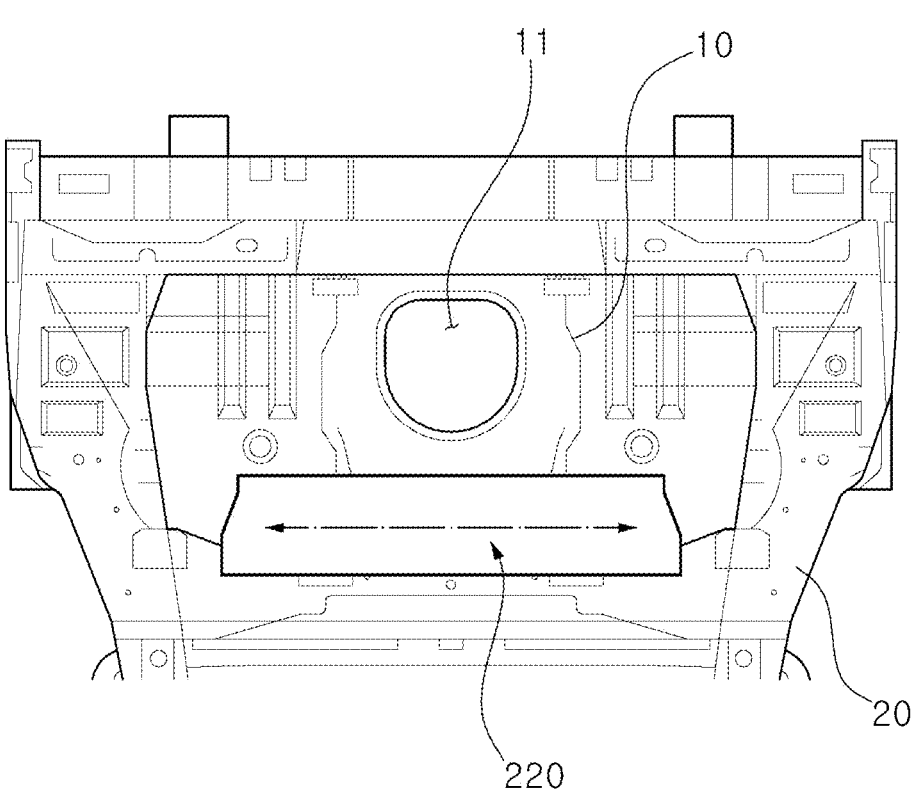
Figure 11:
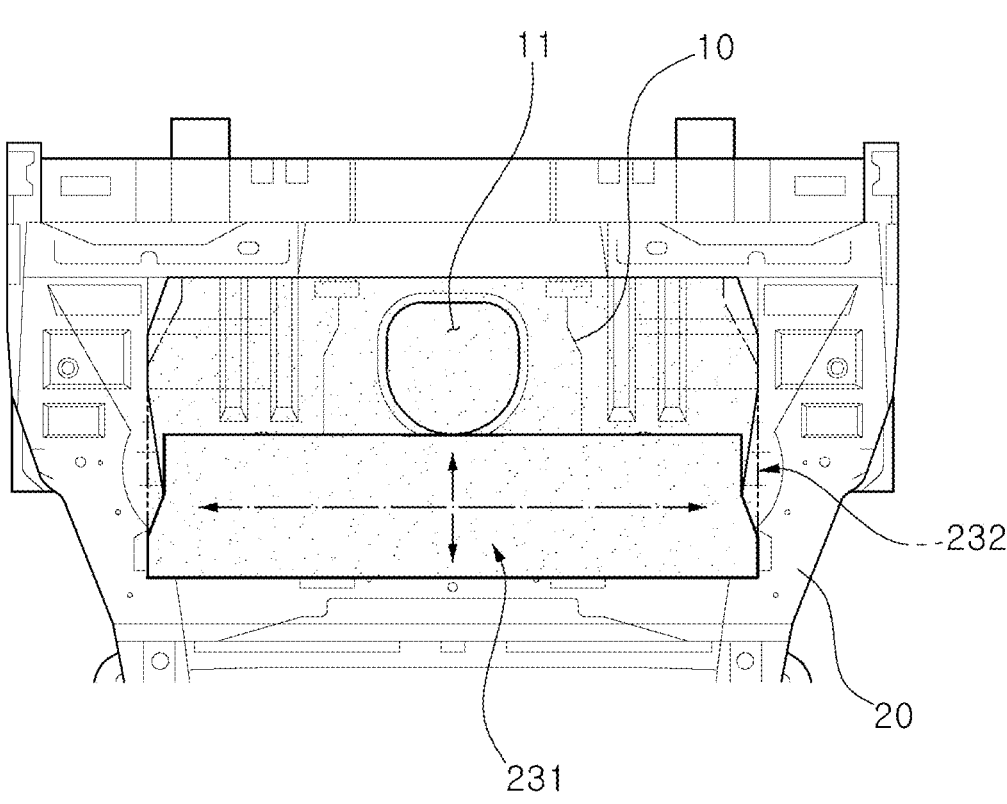

Next, FIGS. 9 to 11 are schematic diagrams illustrating the reinforcement member according to another embodiment of the present disclosure.

Unlike the above-described basic structure of the reinforcing member, the reinforcement member may be formed in a front-rear extension type as shown in FIG. 9.

That is, a reinforcement member 211 of FIG. 9 may be formed to extend to an end of the maintenance cover hole 11 or may have a structure in which a rear end of the reinforcement member 211 extends over a cross-section of the rear floor center cross member 20 in the form of surrounding the maintenance cover hole 11.

Next, as shown in FIG. 10, the reinforcement member may be formed in a left-right extension type.

That is, a reinforcement member 220 of FIG. 10 has a structure which is formed to extend in both left and right lateral directions in the structure of the first embodiment of FIG. 4 so that a width of the reinforcement member 220 connected to the rear floor center cross member 20 becomes wide.

Alternatively, as shown in FIG. 11, a reinforcement member 231 may be formed in a front-rear and left-right extension type.

That is, the reinforcement member 231 of FIG. 11 has a structure extending from the structure of the first embodiment of FIG. 4 in front-rear and left-right directions and is formed to have the width connected to the rear floor center cross member 20 to become wide. In addition, the reinforcement member 231 may be formed to extend to the end of the maintenance cover hole 11 or may be formed to extend in the form of surrounding the maintenance cover hole 11.

Next, FIGS. 12 to 15 are schematic diagrams illustrating other modified examples of the reinforcement member according to embodiments of the present disclosure. The modified examples of FIGS. 12 to 15 relate to performance reinforcement members when a maintenance cover hole 12 is not located in the center of the rear floor panel 10 and is formed to be biased in one lateral direction as shown in the drawings.

Figure 12:
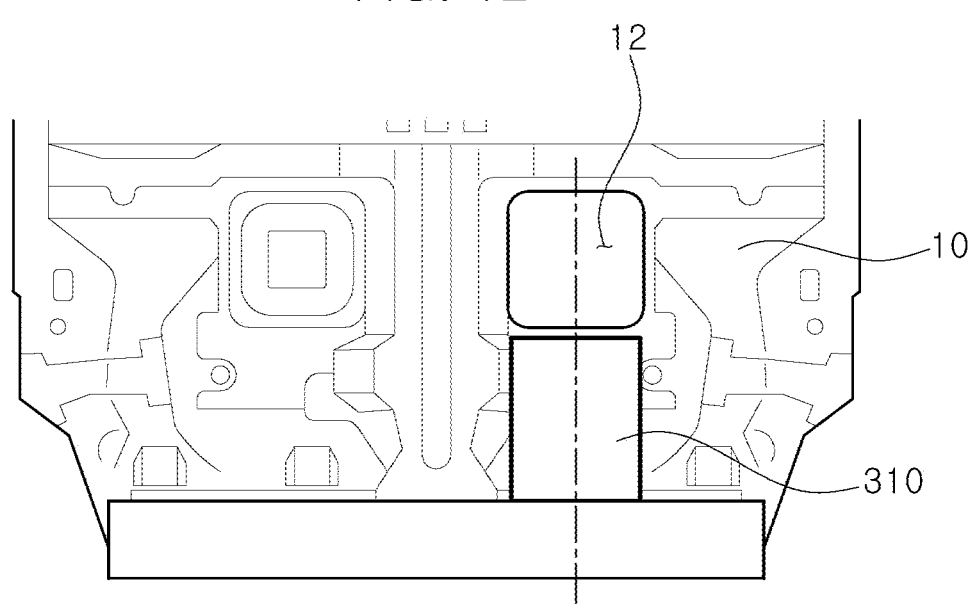
FIGS. 12 to 15 are schematic diagram illustrating other modified examples of the reinforcement member according to embodiments of the present disclosure.

A reinforcement member 310 of FIG. 12 has a shape extending from the rear floor center cross member 20 in a y-axis direction on the same x-axis coordinates as a position of the maintenance cover hole 12 in a certain shape. That is, a case in which the reinforcement member of the basic structure is moved in an x-axis direction is applied to the reinforcement member 310.

Figure 13:
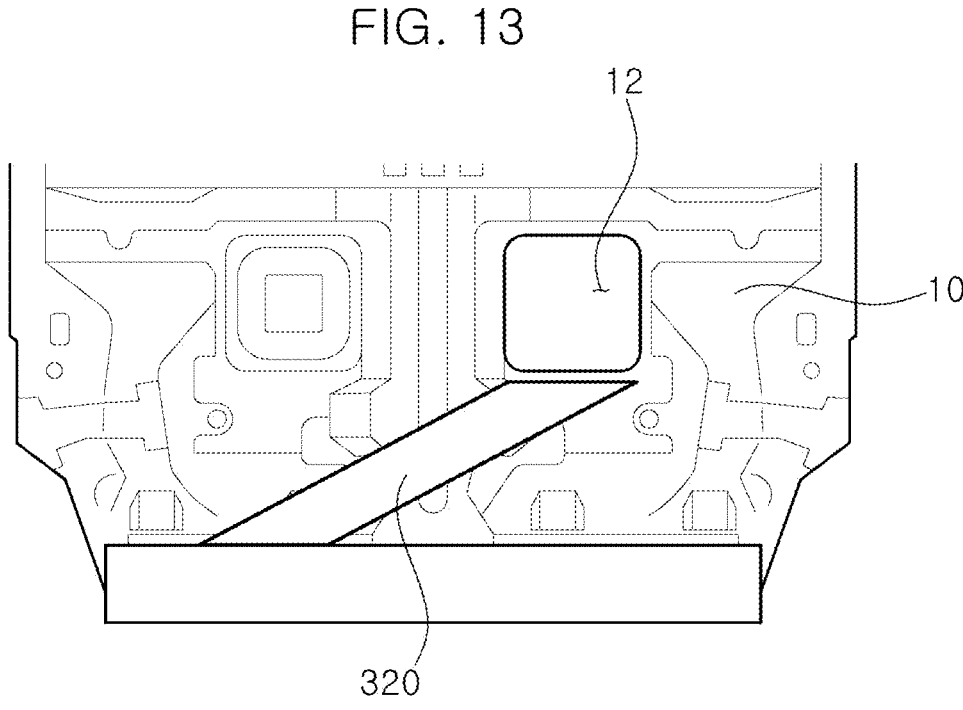

Next, a reinforcement member 320 in FIG. 13 is connected to the cross-section of the rear floor center cross member 20 on an x-coordinate line that is not the same as the position of the maintenance cover hole 12 and is connected to the maintenance cover hole 12 at an angle in a constant shape. That is, this is a case in which the reinforcement member 320 is formed such that a length direction of the reinforcement member 320 is inclined with respect to the length direction of the rear floor panel 10.

Figure 14:
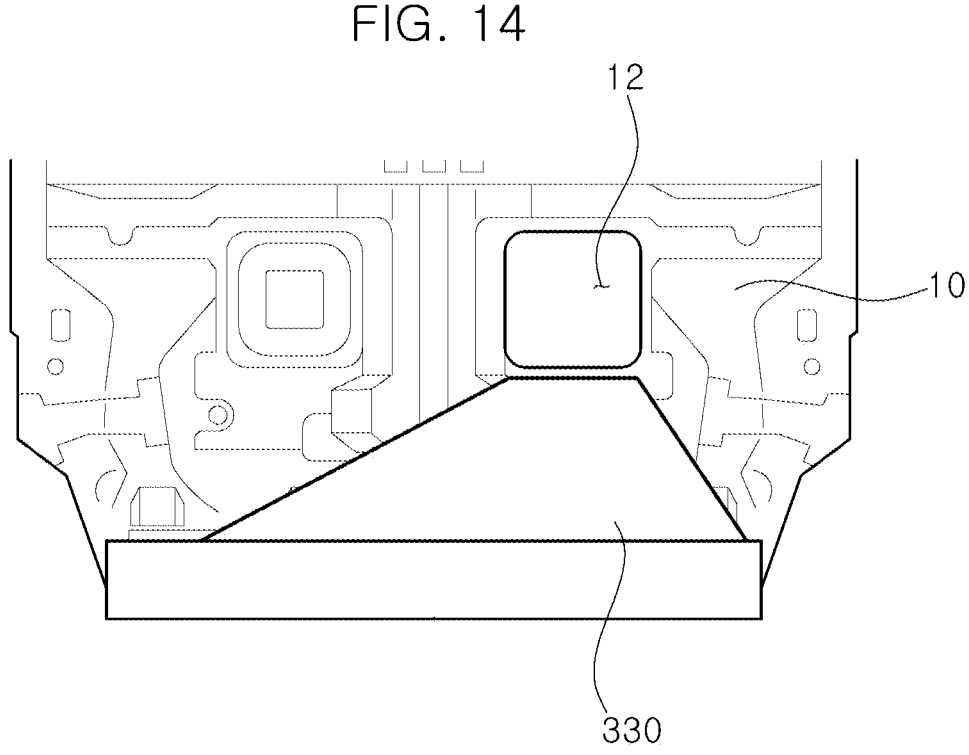

Alternatively, a reinforcement member 330 of FIG. 14 has a shape which is widely connected to the maintenance cover hole 12 in a width direction of the rear floor center cross member 20 and becomes narrow.

That is, a width of a rear end of the reinforcement member 330 is formed to be greater than a width of a front end thereof.

Figure 15:
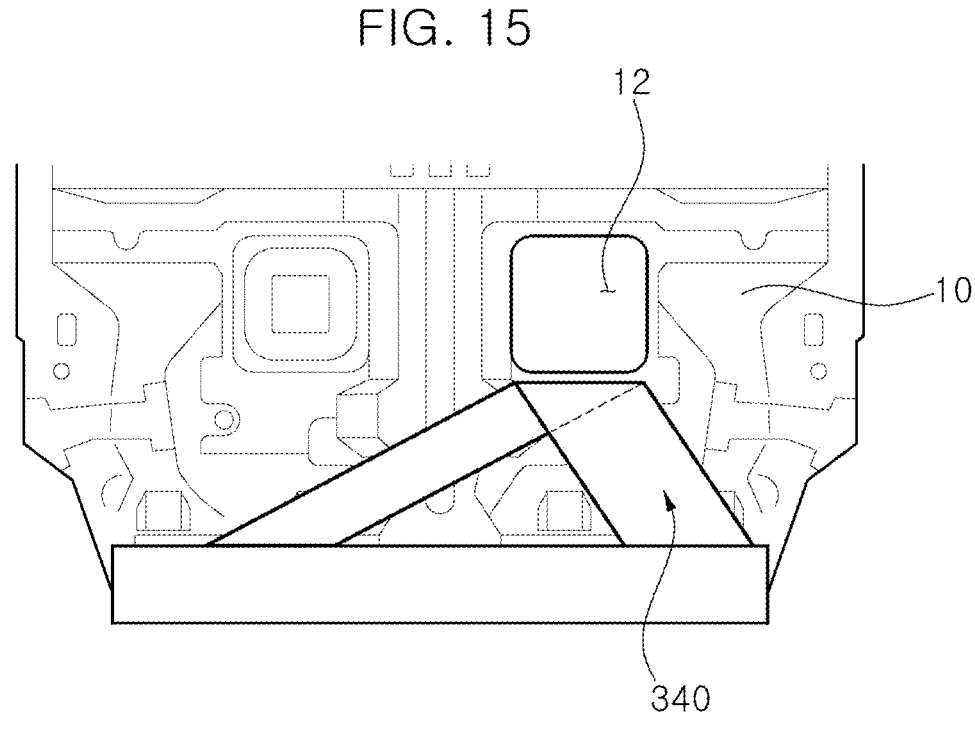

Alternatively, a reinforcement member 340 of FIG. 15 has a shape in which two or more reinforcement members are connected to the rear floor center cross member 20 on the same or a different x-axis coordinate line as the maintenance cover hole 12 and connected to the maintenance cover hole 12 in front of the reinforcement member 340.

That is, the reinforcement member 340 has a structure in which a plurality of reinforcement members 320 of FIG. 13 may be formed and front end portions of the reinforcement members 340 may be connected to each other.

As described above, the reinforcement member of the rear floor panel according to embodiments of the present disclosure may have various shapes, may further reinforce the NVH performance of the rear floor panel, and may be modified and applied according to various positions of the maintenance cover holes.

In accordance with embodiments of the present disclosure, rigidity of an after-sales service (A/S) cover hole, which is regarded as a structural weakness of a rear floor panel, is increased so that it is possible to contribute to securing rigidity of the entirety of a vehicle body.

The above structure does not affect a package layout of a second-row seat so that it is advantageous to secure dwelling ability.

In addition, when compared to an NVH improvement plan of the existing rear floor, it can secure a high level of performance satisfaction with less weight.

For example, when a weight of 190 g is applied, an improvement effect of a resonant sound of 1.2 dB, a rumble of 0.6 dB, and an overall sound intensity (OA) of 0.6 dB can be obtained.

While embodiments of the present disclosure have been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternatives or modifications fall within the claims of the present disclosure, and the scope of the present disclosure should be construed on the basis of the appended claims.

What is claimed is:

1. A reinforcement member for a rear floor panel, the reinforcement member comprising:
    a rigidity transfer portion that protrudes, is spaced apart from an upper surface of the rear floor panel, and extends from a rear end to a front end of the reinforcement member,
    wherein:
        the rigidity transfer portion comprises:
            a rear portion extending forward from the rear end of the reinforcement member; and
            a front portion extending from the rear portion to the front end of the reinforcement member,
        the reinforcement member is configured to:
            be disposed on the upper surface of the rear floor panel;
            be coupled to a rear floor center cross member that supports a rear surface of the rear floor panel; and
            be connected to a maintenance cover hole in the rear floor panel from the rear floor center cross member, and
        the front portion is divided into two branches.

2. The reinforcement member of claim 1, further comprising:
    a front extension extending from the front end to the maintenance cover hole; and
    a rear extension extending from the rear end to an end of the rear floor center cross member.

3. The reinforcement member of claim 1, wherein a first length direction of the reinforcement member extends in an inclined direction with respect to a second length direction of the rear floor panel.

4. The reinforcement member of claim 1, wherein a first width of the rear end of the reinforcement member is greater than a second width of the front end thereof.

5. A reinforcement member for a rear floor panel, the reinforcement member comprising:

a rigidity transfer portion that protrudes, is spaced apart from an upper surface of the rear floor panel, and extends from a rear end to a front end of the reinforcement member, wherein:

the rigidity transfer portion comprises:

a rear portion extending forward from the rear end of the reinforcement member; and a front portion extending from the rear portion to the front end of the reinforcement member, the reinforcement member is configured to:

be disposed on the upper surface of the rear floor panel;

be coupled to a rear floor center cross member that supports a rear surface of the rear floor panel; and be connected to a maintenance cover hole in the rear floor panel from the rear floor center cross member, and the rigidity transfer portion further comprises a pair of legs spaced apart from both side surfaces of the rear portion and connected to both side surfaces of the front portion.

6. The reinforcement member of claim 5, further comprising:

a front extension extending from the front end to the maintenance cover hole; and a rear extension extending from the rear end to an end of the rear floor center cross member.

7. The reinforcement member of claim 5, wherein a first length direction of the reinforcement member extends in an inclined direction with respect to a second length direction of the rear floor panel.

8. The reinforcement member of claim 5, wherein a first width of the rear end of the reinforcement member is greater than a second width of the front end thereof.

9. A vehicle comprising:

a vehicle body comprising a rear floor panel;

a maintenance cover hole in the rear floor panel;

a rear floor center cross member coupled to a lower surface of the rear floor panel;

a reinforcement member disposed on an upper surface of the rear floor panel, coupled to an inclined portion of the rear floor panel, coupled to the rear floor center cross member, and connected to the maintenance cover hole from the rear floor center cross member;

a seat disposed over the rear floor panel;

a rigidity transfer portion that is spaced apart from the upper surface of the rear floor panel and extends from a rear end to a front end of the reinforcement member, wherein:

the rigidity transfer portion comprises:

a rear portion extending forward from the rear end of the reinforcement member; and a front portion extending from the rear portion to the front end of the reinforcement member, and the front portion is divided into two branches.

10. The vehicle of claim 9, wherein:

the front portion and the rear portion have a step difference with respect to the front portion, and the inclined portion is inclinedly connected between the front portion and the rear portion.

11. The vehicle of claim 10, wherein the reinforcement member is disposed on an upper surface of the inclined portion.

12. The vehicle of claim 9, wherein the rigidity transfer portion comprises a pair of legs spaced apart from both side surfaces of the rear portion and connected to both side surfaces of the front portion.

13. The vehicle of claim 9, further comprising:

a front extension extending from the front end to the maintenance cover hole; and a rear extension extending from the rear end to an end of the rear floor center cross member.

14. The vehicle of claim 9, wherein a first length direction of the reinforcement member extends in an inclined direction with respect to a second length direction of the rear floor panel.

15. The vehicle of claim 9, wherein a first width of the rear end of the reinforcement member is greater than a second width of the front end thereof.

* * * * *